US012620874B2

(12) United States Patent
Zahid et al.

(10) Patent No.: US 12,620,874 B2
(45) Date of Patent: May 5, 2026

(54) WINDING SLOT-EMBEDDED VAPOR CHAMBERS AND HEAT PIPES WITH ENDCAP HEAT SINKS FOR ELECTRIC MACHINES

(71) Applicant: GM GLOBAL TECHNOLOGY OPERATIONS LLC, Detroit, MI (US)

(72) Inventors: Muhammad A. Zahid, Troy, MI (US); Alexander Forsyth, Windsor (CA); Khorshed Mohammed Alam, Canton, MI (US); Mazharul Chowdhury, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 325 days.

(21) Appl. No.: 18/482,260

(22) Filed: Oct. 6, 2023

(65) Prior Publication Data

US 2025/0119025 A1     Apr. 10, 2025

(51) Int. Cl.
H02K 9/22          (2006.01)
B60K 1/00          (2006.01)
        (Continued)

(52) U.S. Cl.
CPC .............. H02K 9/225 (2021.01); B60L 50/60 (2019.02); H02K 9/20 (2013.01);
        (Continued)

(58) Field of Classification Search
CPC ............ H02K 9/225; H02K 9/20; H02K 1/32; H02K 9/19; B60L 50/60; B60K 1/04; B60K 11/02; B60K 2001/006
See application file for complete search history.

(56) References Cited

U.S. PATENT DOCUMENTS 5,140,204 A     8/1992  Cashmore et al.
6,163,127 A    12/2000  Patel
            (Continued)

FOREIGN PATENT DOCUMENTS

DE          2052839 A1     4/1972
DE        10258778 A1     7/2004
            (Continued)

*Primary Examiner* — Tulsidas C Patel
*Assistant Examiner* — Mohammed Ahmed Qureshi
(74) *Attorney, Agent, or Firm* — Quinn IP Law

(57)          ABSTRACT

Presented are electric machines with winding-slot embedded heat pipes/vapor chambers and endcap-integrated heat sinks, methods for making/using such machines, and vehicles equipped with such machines. An electric machine, such as a traction motor or electric generator, includes an outer housing, a stator assembly mounted to the housing, and a rotor assembly rotatably mounted adjacent the stator assembly. The stator assembly includes an annular stator core with one or more electromagnetic stator windings mounted on or in the stator core. The rotor assembly includes a cylindrical rotor core and one or more electromagnetic rotor windings mounted in rotor slots of the rotor core. One or more heat pipes are mounted in the rotor slot(s), adjacent the rotor winding(s), and projecting axially from one or both axial ends of the rotor core. Each heat pipe extracts thermal energy from the rotor winding(s) and transfers the thermal energy out from the rotor core.

20 Claims, 4 Drawing Sheets

(51) Int. Cl.

| | |
|---|---|
| *B60K 1/04* | (2019.01) |
| *B60K 11/02* | (2006.01) |
| *B60L 50/60* | (2019.01) |
| *H02K 9/20* | (2006.01) |

(52) U.S. Cl.

CPC .......... *B60K 2001/006* (2013.01); *B60K 1/04* (2013.01); *B60K 11/02* (2013.01)

(56) References Cited

U.S. PATENT DOCUMENTS

| | | | |
|---|---|---|---|
| 6,209,672 B1 * | 4/2001 | Severinsky ............ | B60K 6/442 |
| | | | 180/65.23 |
| 6,528,909 B1 | 3/2003 | Kan et al. | |
| 6,943,467 B2 | 9/2005 | Potoradi et al. | |
| 7,569,955 B2 | 8/2009 | Hassett et al. | |
| 8,134,260 B2 * | 3/2012 | Hassett .................. | H02K 9/225 |
| | | | 310/58 |
| 8,138,651 B2 | 3/2012 | Rahman | |
| 8,368,265 B2 | 2/2013 | Owng | |
| 8,492,952 B2 | 7/2013 | Bradfield | |
| 11,025,116 B2 | 6/2021 | Yao | |
| 11,207,982 B2 | 12/2021 | Liu | |
| 11,323,001 B2 | 5/2022 | Nehl | |
| 11,375,642 B2 | 6/2022 | Liu | |
| 11,598,589 B2 | 3/2023 | Roy | |
| 2006/0066156 A1 | 3/2006 | Dong et al. | |
| 2013/0049497 A1 | 2/2013 | Terakado et al. | |
| 2018/0367005 A1 | 12/2018 | Rahman et al. | |
| 2022/0239197 A1 | 7/2022 | Yatsurugi | |
| 2023/0011641 A1 | 1/2023 | Keum | |
| 2023/0046826 A1 | 2/2023 | Keum | |
| 2023/0208216 A1 | 6/2023 | Momen | |

FOREIGN PATENT DOCUMENTS

| | | |
|---|---|---|
| DE | 102022122605 A1 | 1/2023 |
| JP | S55166162 A | 12/1980 |
| JP | S56102980 A | 8/1981 |

* cited by examiner

WINDING SLOT-EMBEDDED VAPOR CHAMBERS AND HEAT PIPES WITH ENDCAP HEAT SINKS FOR ELECTRIC MACHINES

INTRODUCTION

The present disclosure relates generally to electric machines. More specifically, aspects of this disclosure relate to thermal management systems for regulating the operating temperatures of separately excited motor (SEM) assemblies.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability, relative light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

SUMMARY

A traction motor is an electric machine that converts electrical energy into rotational mechanical energy to propel a vehicle, such as FEV and HEV-type automobiles. Many traction motors contain a fixedly mounted stator that carries multiphase electromagnetic windings, such as copper hairpin or I-pin bars, and a rotatable rotor that bears an engineered pattern of magnets, such as core-mounted permanent magnets (PM), or electromagnetic armature windings, such as core-mounted copper coils. Traction motors may be categorized as alternating current (AC) or direct current (DC), brushed or brushless, rotary or linear, and radial flux or axial flux. In radial-flux, internal-rotor designs, the rotor may be coaxially nested inside the stator, whereas axial-flux rotary designs may juxtapose the rotor and stator as facing, coaxial plates. Rotational excitation of the rotor assembly may be effected by a magnetic field that is produced by passing current through multiphase AC stator windings; this stator-emitted magnetic field interacts with a mating magnetic field that is produced by rotor-borne permanent magnets or DC armature coils.

The rotor assemblies for many modern-day traction motors include a rotor core that is fabricated from thin ferromagnetic discs that are stacked and laminated together into a cylindrical body. Each rotor disc has several openings that, when aligned with the openings of neighboring discs, form rotor slots that extend axially through the length of the rotor core. Persistent-state or electrically excited magnetic elements, such as PM bars or copper coils, are inserted into these rotor slots and secured to the rotor core. Unlike permanent magnet motor constructions, in which the rotor assembly bears internal or surface-mounted magnets, a separately excited motor (SEM) is generally typified by rotor-borne armature windings that electromagnetically mate with stator-borne field windings to convert electrical energy into mechanical energy. The rotor core may be mounted onto a motor shaft for outputting propulsion-generating motor torque produced by the motor or for inputting electricity-generating regenerative torque received by the motor.

During operation of a traction motor, the internal electrical and electromagnetic hardware may generate a significant amount of heat, e.g., due to windage, friction, and hysteresis losses. An integrated motor cooling system may be employed to prevent undesirable overheating conditions within the motor. Active thermal management (ATM) systems, for example, employ a central controller or dedicated control module to regulate the operation of a cooling circuit that circulates coolant fluid through the heat-producing motor components. For indirect liquid cooling systems, a heat-transfer coolant is circulated through a network of internal channels and pipes within the motor housing. In contrast, direct liquid cooling systems—or "liquid immersion cooling" (LIC)—splash, spray, or immerse parts of the motor with/within a direct-conduction dielectric liquid coolant.

Presented herein are electric machines with winding slot-embedded heat pipes and/or vapor chambers and endcap-integrated heat sinks, methods for manufacturing and methods for operating such machines, and vehicles equipped with such machines. By way of non-limiting example, a novel separately excited motor design extracts heat from the rotor-borne windings by integrating heat pipes and/or vapor chambers into each rotor pole and entrenching the pipes/chambers within the winding bundles. Extracted heat may be transmitted axially to opposing axial ends of the rotor core and transferred into the larger thermal bodies of the rotor endcaps. The rotor endcaps may be fabricated with axial pin fins that dissipate the transferred heat into an interior coolant volume of the drive unit (DU) housing. Spray or splash-type cooling may be employed to extract heat from the pin fins and concomitantly carry the thermal energy out from the DU housing. Each heat pipe/vapor chamber may be embedded within an axial rotor slot gap and surrounded by the rotor windings. The axially projecting pin fins may be integrally formed into the rotor endcaps, e.g., to efficiently dissipate heat to the DU housing volume. Endcap spray cooling and/or splash cooling may be employed to accelerate endcap thermal conductivity and, thus, facilitate heat extraction from the rotor windings.

Attendant benefits for at least some of the disclosed concepts include SEM architectures with reduced winding temperatures (e.g., at worst-case operating points (WCOP)) that result in enhanced motor efficiency and expanded motor performance limits (i.e., over comparable IPM designs). Unlike complex shaft-fed ATM cooling designs, which add significant cost, complexity, and points of failure to the system, disclosed SEM designs use sealed heat pipes/vapor chambers and endcap heat sinks to quickly and efficiently extract heat from the motor windings. Other attendant advantages may include SEM systems that eliminate the need for rare earth (RE) and heavy rare earth (HRE) materials that may be susceptible to volatile price variations and commodity shortages. Unlike many conventional SEM solutions, which elect to operate at lower peak rotor field currents and limit peak rotor field magnitudes to reduce motor temperatures, disclosed SEM systems use both active and passive cooling features to extract winding heat caused by copper losses and, thus, expand SEM peak performance limits.

Aspects of this disclosure are directed to winding slot-embedded vapor chambers and/or heat pipes for cooling the electromagnetic rotor and/or stator windings of electric machines, such as motors, generators, transformers, inductors, dynamometers, converters, etc. In an example, an electric machine includes a protective outer housing, a stator assembly fixedly attached to the housing, and a rotor assembly rotatably attached to the housing adjacent the stator assembly. The stator assembly includes a stator core with at least one stator slot and at least one electromagnetic stator winding mounted in the stator slot(s). In the same vein, the rotor assembly includes a rotor core with at least one rotor slot and at least one electromagnetic rotor winding mounted in the rotor slot(s). At least one heat pipe is mounted in one, some, or all of the rotor slot(s) adjacent the rotor winding(s). The heat pipe(s) project axially from one or both opposing axial ends of the rotor core. Each heat pipe passively extracts thermal energy from the rotor winding(s) and transfers the extracted thermal energy out from the rotor core.

Additional aspects of this disclosure are directed to electric-drive vehicles that are propelled by SEM-type traction motors cooled by winding slot-embedded vapor chambers and/or heat pipes. As used herein, the terms "vehicle" and "motor vehicle" may be used interchangeably and synonymously to reference any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, e-bikes, etc. In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, the vehicle is equipped with a rechargeable energy storage system (RESS) (e.g., traction batter pack) and an electrified powertrain that employs one or more traction motor/generator units (MGU), which operate alone (e.g., for FEV powertrains) or in conjunction with an internal combustion engine assembly (e.g., for HEV powertrains), to selectively drive one or more of the road wheels to thereby propel the vehicle.

Continuing with the preceding discussion, the traction motor includes a protective and insulating motor housing, a stator assembly that is rigidly mounted inside the motor housing, and a rotor assembly that is rotatably mounted inside the motor housing adjacent the stator assembly. The stator assembly includes an annular stator core with a series of circumferentially spaced stator slots within which are mounted multiple electromagnetic stator windings (e.g., copper hairpin winding bars). Conversely, the rotor assembly includes a cylindrical rotor core that is nested inside of and circumscribed by the annular stator core. The rotor core has a series of circumferentially spaced rotor slots within which are mounted multiple electromagnetic rotor windings (e.g., copper winding coils). A single or a set of heat pipes is mounted in each rotor slot adjacent the rotor windings in that slot and projecting axially out from one or both axial ends of the rotor core. Each heat pipe includes a sealed canister that contains a working fluid that changes phases between liquid and gas to thereby extract thermal energy from the rotor windings and transmit the extracted thermal energy out through the axial end(s) of the rotor core.

Aspects of this disclosure are also directed to manufacturing workflow processes, computer-readable media, and control logic for making or for using any of the disclosed winding cooling systems, electric machines, and/or motor vehicles. In an example, a method is presented for assembling an electric machine. This representative method includes, in any order and in any combination with any of the above and below disclosed options and features: receiving a housing of the electric machine; attaching a stator assembly to the housing, the stator assembly including a stator core and an electromagnetic stator winding mounted in a stator slot of the stator core; attaching a rotor assembly to the housing such that the rotor assembly is adjacent and rotatable with respect to the stator assembly, the rotor assembly including a rotor core and an electromagnetic rotor winding mounted in a rotor slot of the rotor core; and mounting a heat pipe in the rotor slot such that the heat pipe is adjacent the rotor winding and projects axially from an axial end of the rotor core, wherein the heat pipe is configured to passively extract thermal energy from the rotor winding and transfer the thermal energy out from the rotor core.

For any of the disclosed vehicles, methods, and electric machines, the rotor assembly may contain a bundle of rotor windings that is mounted in the rotor slot. In this instance, the heat pipe may include multiple heat pipes that are mounted in the rotor slot and embedded inside the bundle of rotor windings. As a further option, the heat pipes in a given rotor slot may be stacked in a rectilinear line that extends radially with respect to the rotor core. In this instance, the heat pipes may be mutually parallel and radially spaced from one another. For multi-slot, multi-bundle configurations, the electric machine may contain multiple stacks of heat pipes that are spaced equidistant from one another around the rotor core, with each heat pipe stack oriented at an oblique angle with respect to its neighboring heat pipe stacks.

For any of the disclosed vehicles, methods, and electric machines, each heat pipe may include a sealed, thermally conductive canister (e.g., copper or aluminum tube) that contains a working fluid (e.g., water, acetone, methanol, or ammonia). The working fluid changes phases between liquid and gas to thereby extract heat from the rotor winding(s) and transmit the extracted heat out through one or both axial ends of the rotor core. Located inside the heat pipe canister is a wick structure (e.g., grooved, sintered, or screen-type wick) that abuts and, if desired, covers an interior surface of the canister. The wick structure carries the liquid-phase working fluid, e.g., via capillary action, to the center of the canister. An elongated vapor channel may extend longitudinally through the center of the wick structure. The vapor channel transmits the working fluid, when vaporized to a gas, to the opposing axials ends of the sealed canister; when the working fluid is condensed to a liquid, the vapor channel transmits the fluid into the wick structure.

For any of the disclosed vehicles, methods, and electric machines, a left-side (first) rotor endcap may be attached to one axial end of the rotor core and a right-side (second) rotor endcap may be attached to the opposite axial end of the rotor core. Each endcap abuts a longitudinal end of the heat pipe(s) to receive therefrom the extracted thermal energy transferred out from the rotor core. The rotor endcap may be a toroidal, plate-like structure that includes one or more heat pipe cavities, each of which is recessed into an inward-facing axial surface of the rotor endcap and nests therein the longitudinal end of the heat pipe. Each rotor endcap may be fabricated with a set of endcap fins that project axially away from the rotor core; these endcap fins dissipate the extracted thermal energy transferred out from the rotor core and received by the rotor endcap. An optional active thermal management system may splash or spray a dielectric coolant fluid onto the endcap fins and, if desired, pump the heated coolant fluid away from the rotor assembly.

For any of the disclosed vehicles, methods, and electric machines, the rotor assembly may include a series of circumferentially spaced rotor slots, each of which extends axially through the rotor core and has open terminal ends. In this instance, a group of rotor windings may be wound through and secured inside each rotor slot. A single heat pipe or a group of heat pipes may be secured inside each of the rotor slots, e.g., extending through the center of the grouped rotor windings in that slot. The heat pipes may be arranged in discrete pipe stacks that are spaced circumferentially around the rotor core, embedded in the rotor windings, and each located in a respective one of the rotor slots.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
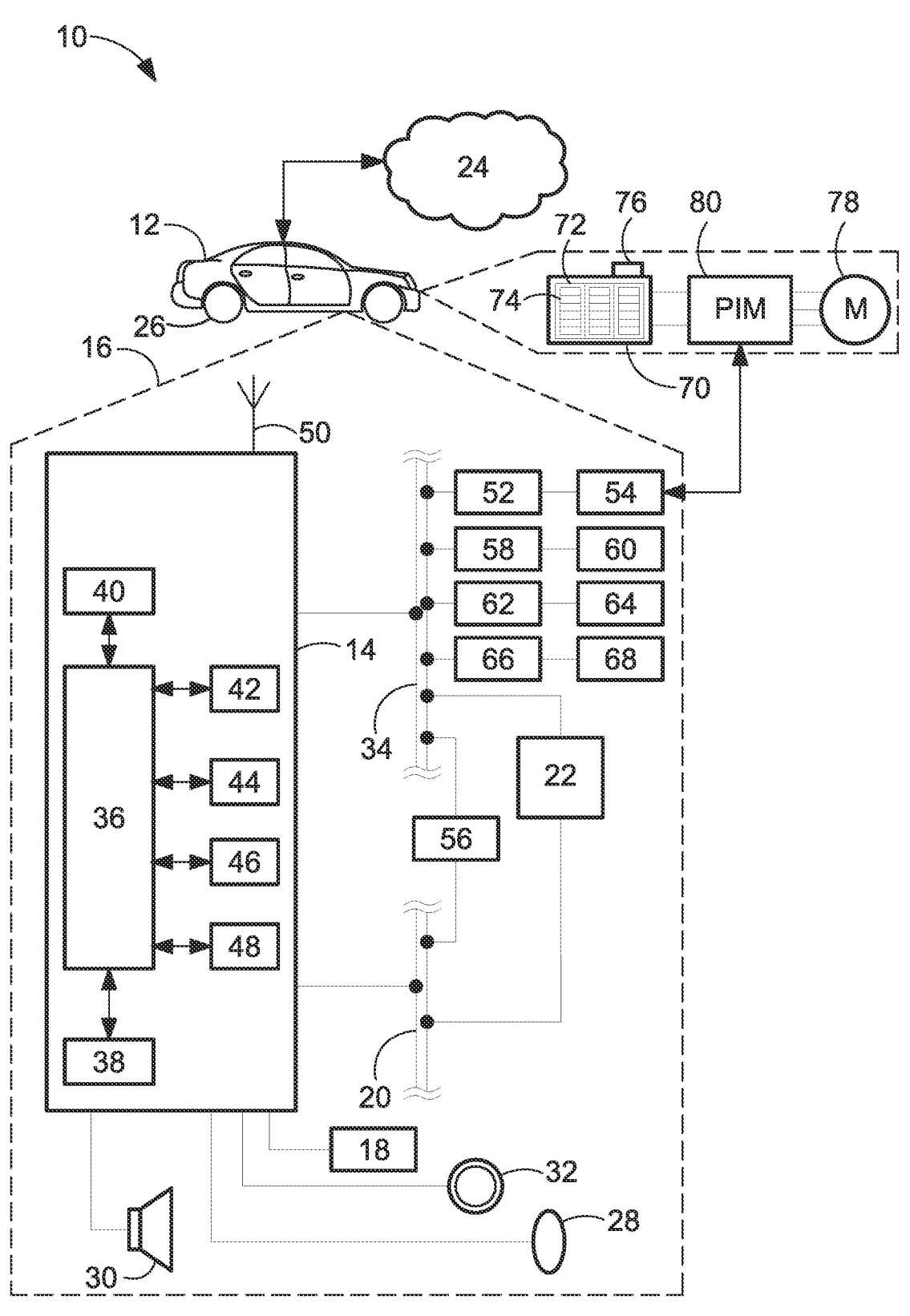
FIG. 1 is a partially schematic, side-view illustration of a representative motor vehicle with a rechargeable traction battery pack, a high-voltage electrical system, and an SEM-based electrified powertrain with which aspects of this disclosure may be practiced.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into an FEV powertrain powered by a single-pack RESS and a single traction motor should be appreciated as a non-limiting implementation of disclosed features. As such, it will be understood that aspects and features of this disclosure may be applied to other powertrain architectures, incorporated into any logically relevant type of motor vehicle, and utilized for both automotive and non-automotive applications alike. Moreover, only select components of the motor vehicles, SEM drives, and HV electrical systems are shown and described in additional detail herein. Nevertheless, the vehicles, SEMs, and electrical systems discussed below may include numerous additional and alternative features, and other available peripheral components, for carrying out the various methods and functions of this disclosure.

The representative vehicle 10 of FIG. 1 is originally equipped with a centerstack telecommunications and information ("telematics") unit 14 that wirelessly communicates, e.g., via cell towers, satellite service, etc., with a remotely located cloud computing host service 24 (e.g., ONSTAR®). Other in-vehicle hardware components 16 shown in FIG. 1 include, as non-limiting examples, an electronic video display device 18, a microphone 28, audio speakers 30, and assorted user input controls 32 (e.g., buttons, knobs, switches, touchscreens, etc.). These hardware components 16 function as a human/machine interface (HMI) that enables a user to communicate with the telematics unit 14 and other components both resident to and remote from the vehicle 10. Microphone 28, for instance, provides occupants with means to input verbal commands. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is the network connection interface 34, suitable examples of which include twisted pair/fiber optic Ethernet switches, parallel/serial communications buses, local area network (LAN) interfaces, controller area network (CAN) interfaces, and the like. Network connection interface 34 enables vehicle hardware 16 to send and receive signals with one another and with systems and subsystems both onboard and off-board the vehicle body 12. This allows the vehicle 10 to perform assorted vehicle functions, such as modulating powertrain output, activating a vehicle brake system, controlling vehicle steering, regulating charge and discharge of vehicle batteries, and other automated functions. For instance, telematics unit 14 may receive and transmit signals to/from a Powertrain Control Module (PCM) 52, an Onboard Charging Module (OBCM) 54, an Electronic Battery Control Module (EBCM) 56, a Steering Control Module (SCM) 58, a Brake System Control Module (BSCM) 60, and assorted other vehicle ECUs.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to an IC real-time clock (RTC) 42 and one or more electronic memory devices 38, each of which may take on the form of a CD-ROM, solid-state drive (SSD) memory, hard-disk drive (HDD) memory, semiconductor memory, etc.

Long-range communication (LRC) capabilities with off-board devices may be provided via a cellular communication component, a navigation and location component (e.g., global positioning system (GPS) transceiver), or a wireless modem, all of which are collectively represented at 44. Short-range communication (SRC) may be provided via a close-range wireless communication device 46 (e.g., a BLUETOOTH® unit), a dedicated short-range communications (DSRC) component 48, and/or a dual antenna 50. It should be understood that the vehicle 10 may be implemented without one or more of the above-listed components or, optionally, may include additional components and functionality as desired for a particular end use. The communications devices described above may provision data exchanges as part of a periodic broadcast in a vehicle-to-vehicle (V2V) communication system or a vehicle-to-everything (V2X) communication system.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of on-vehicle sensors may be adapted, singly or collectively, to a given vehicle platform for achieving a desired level of autonomous vehicle operation.

To propel the motor vehicle 10, an electrified powertrain is operable to generate and deliver tractive torque to one or more of the vehicle's drive wheels 26. The powertrain is represented in FIG. 1 by an electric traction motor 78 that is connected to a rechargeable energy storage system (RESS), which may be in the nature of a chassis-mounted traction battery pack 70. The battery pack 70 may contain one or more battery modules 72 each housing a group of electrochemical battery cells 74, such as lithium-ion or lithium-polymer battery cells of the pouch, can, or prismatic type. One or more electric machines, such as an adjustable-speed, multiphase SEM motor/generator (M) unit 78, draw electrical power from and, optionally, deliver electrical power to one or more rechargeable battery units, such as traction battery pack 70. An HV electrical system with a power inverter 80 electrically connects the battery pack 70 to the motor/generator unit(s) 78 and modulates the transfer of electrical current therebetween. The battery pack 70 may be configured such that module management, cell sensing, and module-to-host communications functionality is integrated directly into each module 72 and performed wirelessly via a wireless-enabled cell monitoring unit (CMU) 76.

Figure 2:
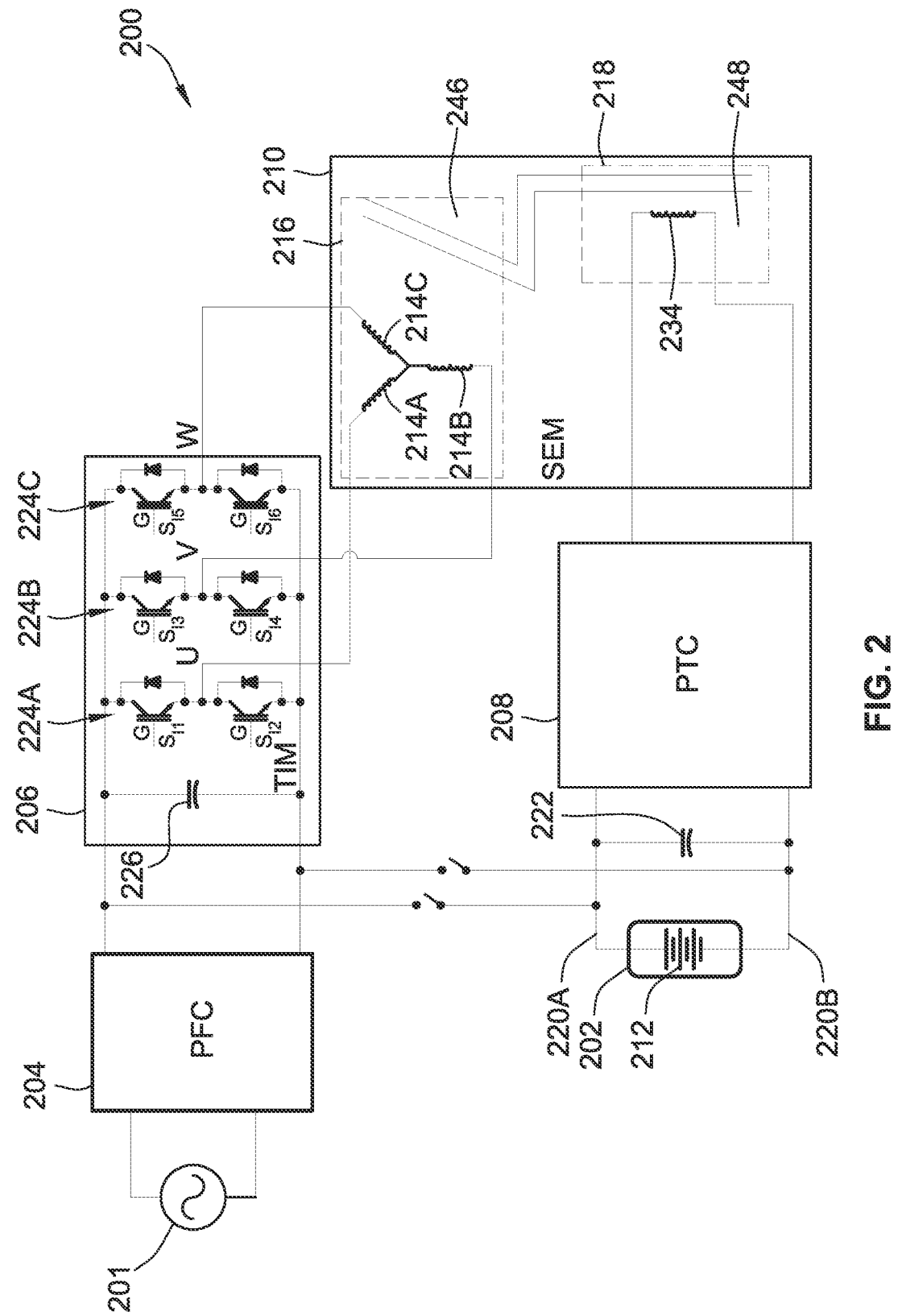
FIG. 2 is a schematic one-line diagram illustrating a representative SEM drive system with which aspects of this disclosure may be practiced.

Turning next to FIG. 2, there is shown a non-limiting example of an SEM drive system 200 that may be adapted for electrically connecting and disconnecting a rechargeable battery assembly 202 to a high-voltage electric power source, such as an AC power utility grid 201. Although differing in appearance, it is envisioned that any of the features and options described herein with reference to the electric traction motor 78 of FIG. 1 and the electric machine 310 of FIG. 3 may be incorporated, singly or in any combination, into the SEM drive system 200 of FIG. 2, and vice versa. While not per se limited, the SEM drive system 200 of FIG. 2 may be typified by a rechargeable battery unit/assembly 202, a power factor correction (PFC) device 204, a traction inverter module (TIM) device 206, a power transfer circuit (PTC) device 208, and a separately excited motor (SEM) unit 210.

The rechargeable battery assembly 202 may take on any of the herein described battery options, including one or more battery packs or one or more battery modules that each contains one or more rechargeable battery cells 212 (e.g., prismatic, pouch, or cylindrical lithium-ion cells). Moreover, each battery assembly may contain a set of solid-state relay contactors/switches (not shown) that are independently responsive to signals from a suitable controller/control module to govern the electrical output of the battery system. While only one battery assembly 202 and one motor 210 are shown in FIG. 2 for illustrative simplicity, the SEM drive system 200 may include any number of battery units, motor units, and associated electrical hardware without departing from the intended scope of this disclosure.

A DC-to-AC and AC-to-DC power inverter 206, which may be part of a traction inverter module (TIM), connects via polyphase windings 214A, 214B and 214C to SEM unit 210 to transmit electrical energy between the SEM 210 and battery assembly 202. In FIG. 2, the TIM device 206 (also referred to as "inverter stage" or "inverter subcircuit") is directly electrically connected to and interposed between the PFC device 204 and the SEM unit 210. In the illustrated example, the TIM device 206 lacks a direct electrical connection to the rotor assembly 218 of the SEM unit 210. A direct-current battery output voltage is delivered from the battery 202 to the TIM 206 and PTC 208 across positive and negative voltage bus rails 220A and 220B, respectively, with an optional fixed-type DC bus capacitor 222 (FIG. 2) placed across the rails 220A, 220B.

Representative power inverter topologies may incorporate multiple inverters and respective motor control modules operable to receive motor control commands and control inverter states therefrom for providing motor drive or regenerative functionality. The TIM device 206 of FIG. 2 may contain one or more pairs of serially connected electromechanical or semiconductor switches that cooperatively convert DC power from one or more energy storage devices (e.g., battery assembly 202) to AC voltage for powering one or more electric machines (e.g., SEM unit 210) via high-frequency switching. In accord with the illustrated example, the TIM device 206 contains six semiconductor switches $S_{I1}$, $S_{I2}$, $S_{I3}$, $S_{I4}$, $S_{I5}$, and $S_{I6}$ that are arranged in three pairs 224A, 224B and 224C of serially connected solid-state TIM switches. These three switch pairs 224A, 224B and 224C may be electrically connected in parallel with each other. Each switch $S_{I1}$-$S_{I6}$ may be embodied as a voltage-controlled bipolar switching device in the form of insulated gate bipolar transistor (IGBT), metal-oxide semiconductor field effect transistor (MOSFET), wideband GaN device (WBG), or other suitable switch having a corresponding gate to which a gate signal is applied to change the on/off state of a given switch.

Each pair of solid-state TIM switches 224A, 224B and 224C may be electrically connected in series to a respective one of the stator-borne field windings 214A, 214B, 214C of an SEM stator assembly 216. Power inverters, such as the TIM device 206 of FIG. 2, may use rapid controller-automated switching control techniques, e.g., pulse-width modulation (PWM) signals, to invert DC power supplied during discharge of the battery unit 202 into AC power suitable for driving the SEM unit 210. A pre-charge circuit (not shown) may be used to charge a DC link capacitor 226 within the TIM device 206 at a controlled rate so as to equalize a voltage across the various pairs of switches 224A-224C prior to closing contactors/switches within the battery unit 202.

A multilevel PFC device 204 selectively electrically connects to the electric power source 201 and, once connected, is interposed between the power source 201 and the remainder of the SEM drive system 200 (i.e., the battery unit 202, TIM 206, PTC 208 and SEM 210). This PFC device 204 (also referred to as a "PFC stage" or "PFC converter") provides power factor correction through shaping of the input current, e.g., to meet electric current harmonic limits of the system 200. In FIG. 2, the PFC device 204 is directly electrically connected to and interposed between the power source 201 and the TIM device 204. In the illustrated example, the PFC device 204 is located on either the stator-side circuit or the rotor-side circuit of the SEM drive system 200, whichever side is opposite that of the battery unit 202. A PFC subcircuit may take on a variety of different topologies, including single-phase and multiphase PFC constructs, multilevel (2-level, 3-level . . . N-level) PFC constructs, active and hybrid switching PFC constructs, etc. A multiphase PFC may be apropos for applications such as that shown in FIG. 2 in which the PFC is located on the stator-side of the SEM in-line with the motor's polyphase windings.

A multilevel PTC device 208 (also referred to as a "PTC stage" or "rotor excitation circuit") is electrically connected on an output-side thereof to the rotor-side of the SEM unit 210 and on an input-side thereof to both the battery unit 202 and the PFC device 204. The PTC device 208 of FIG. 2 may provide single-phase rotor excitation functionality for the SEM's rotor assembly 218, e.g., for optimized motor control and system charging. In FIG. 2, the PTC device 208 is directly electrically connected to and interposed between the battery unit 202 and the SEM rotor assembly 218. In the illustrated example, the PTC device 208 lacks a direct electrical connection to the stator assembly 216 of the SEM unit 210.

A separately excited motor unit 210 is interposed between the TIM 206 and PTC 208 and powered by the rechargeable battery assembly 202 to produce motor output torque, e.g., to rotate the drive wheels 12 of FIG. 1 and thereby propel the vehicle 10 or to perform work in a non-automotive SEM drive application. Unlike polyphase PM electric motors, which rely on rotor-borne permanent magnets, a synchronous wound-field SEM is generally typified by rotor-borne armature windings that electromagnetically mate with stator-borne field windings to convert electrical energy into mechanical energy. As shown, the SEM unit 210 contains a rotor assembly 218 that is coaxial with and rotatable with respect to a stator assembly 216. For radial-flux, internal-rotor designs, the stator assembly 216 includes an annular stator core 246 that carries multiple electromagnetic stator "field" windings 214A-214C. The rotor assembly 218, in contrast, includes a cylindrical rotor core 248 that carries one or more electromagnetic rotor "armature" windings 234. In this example, the rotor core 248 is rotatably mounted inside a hollow center of the stator core 246 such that the stator assembly 216 circumscribes the rotor assembly 218.

The field and armature windings 214A-214C and 234 are energized with electrical power supplied by the battery assembly 202; once energized, the stator-borne field windings 214A-214C electromagnetically couple with and drive the rotor-borne armature winding 234 (the electromagnetic coupling represented in FIG. 2 by the S-shaped parallel lines connecting the stator assembly 216 and the rotor assembly 218). A motor output member, which may be in the nature of a rotor shaft (not shown), may be splined, keyed, bolted, or otherwise fixedly attached to the rotor core 248 to rotate in unison therewith and output therefrom motor torque. Although not per se limited, the stator and rotor cores 246, 248 may be fabricated as laminate core constructions each composed of a stack of iron or other ferrous plates. While illustrated and described as a radial-flux electric machine, the SEM unit 210 may take on axial-flux and transverse-flux architectures within the scope of this disclosure.

Figure 3:
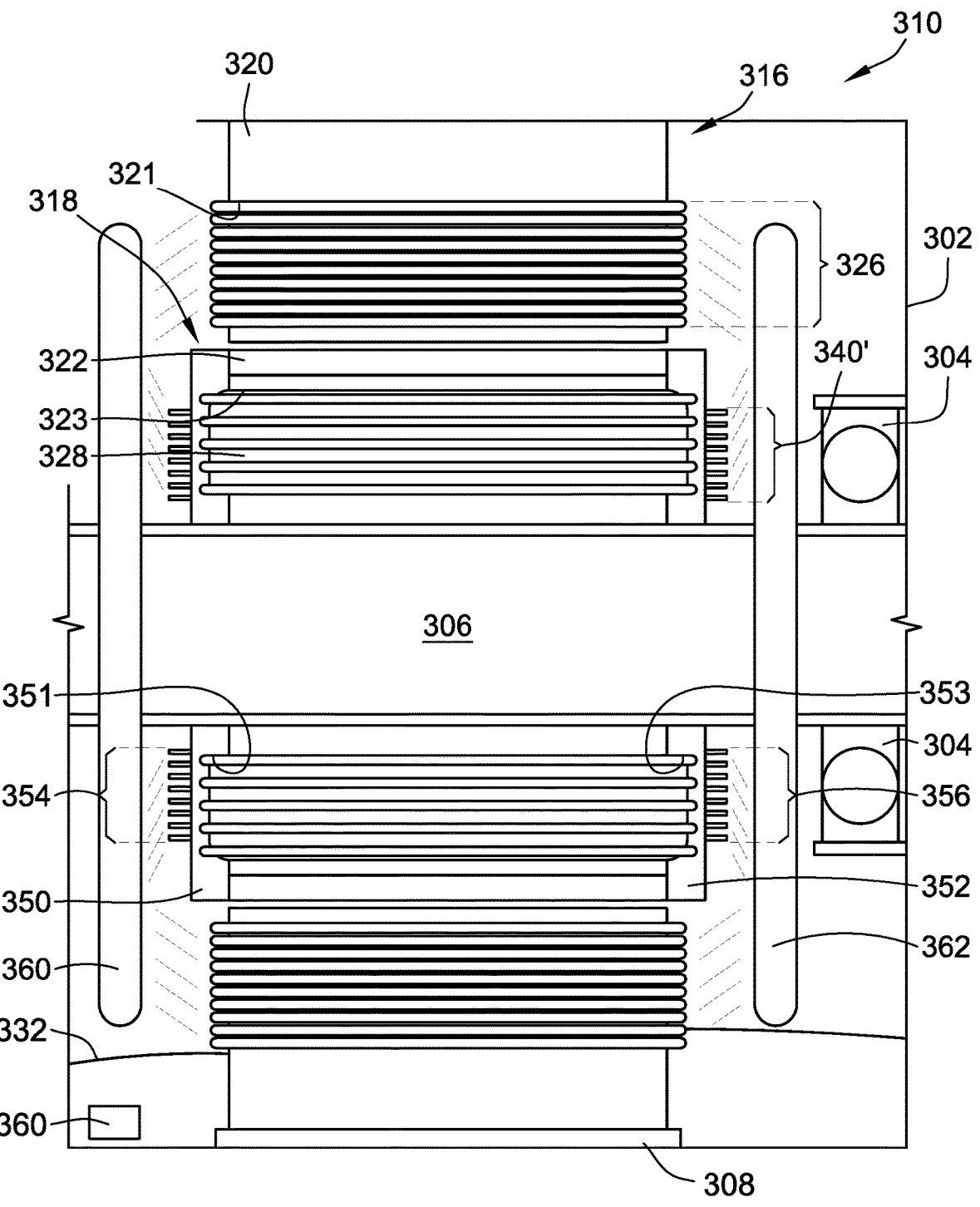
FIG. 3 is a sectional side-view illustration of a representative electric machine with winding-slot embedded heat pipes and endcap-integrated heat sinks in accord with aspects of the present disclosure.

Turning next to FIG. 3, there is shown another example of an electric machine 310, which is represented as a radial-flux, internal-rotor-type separately excited motor unit that is cooled with winding slot-embedded heat pipes or vapor chambers, endcap-integrated heat sinks, and spray or splash-type ATM cooling. As mentioned above, it is envisioned that any of the features and options described with reference to the traction motor 78 of FIG. 1 and the SEM unit 210 of FIG. 2 can be incorporated, singly or in any combination, into the electric machine 310 of FIG. 3, and vice versa. As some non-limiting points of similarity, the electric machine 310 of FIG. 3 is assembled with a protective and insulated outer housing 302 (e.g., a cast-metal integrated electric drive unit (EDU) housing) that provides the mechanical interface for mounting to a system support structure (e.g., unibody or body-on-frame chassis). A multiphase, field-wound and AC-fed stator assembly 316 is rigidly mounted inside the housing 302, e.g., via axial clamping ring 308. Spaced across an airgap from the stator assembly 316 is a single-phase, armature-wound and DC-fed rotor assembly 318, which is rotatably mounted inside the housing 302, e.g., via high-speed precision roller bearings 304. The rotor assembly 318 is securely mounted, e.g., via keying, splining, collar, hub, etc., onto a power-transmitting (motor or output) shaft 306 to rotate in unison therewith. This shaft 306 functions to output torque generated by the electric machine 310 and/or to receive input torque generated by an external source.

Similar to the stator assembly 216 of FIG. 2, the stator assembly 316 of FIG. 3 is constructed with a flux-permeable, stacked-laminate annular stator core 320 having multiple circumferentially spaced stator slots 321 that are aligned radially with and extend axially through the stator core 320. Wound through each axially elongated slot 321 of the stator core 320 is a respective set of electromagnetic "field" conductors 326, which may be in the nature of hairpin, I-pin, D-pin, or flat bar copper conductors. Partitioning the radially innermost ends of the slots 321 are stator teeth that point towards the outer-diameter (OD) periphery of the rotor assembly 318. Stator teeth direct the magnetic flux produced by the stator windings 326 across the airgap to electromagnetically link with electromagnets borne by the rotor assembly 318 before completing the flux path back to the stator assembly 316. Similar to the rotor assembly 218 of FIG. 2, the rotor assembly 318 of FIG. 3 is constructed with a magnetically permeable, stacked-laminate cylindrical rotor core 322 having multiple circumferentially spaced rotor slots 323 that are radially recessed within and extend axially through the rotor core 322. The rotor core 322 is nested inside of and circumscribed by the stator core 320 such that both cores 320, 322 are coaxial with the shaft 306. Wound through the axially elongated rotor slots 323 is an electromagnetic "armature" conductor 328, which may be in the nature of a single-wire or multi-wire winding composition of solid-wire or stranded-wire copper coils.

Figure 4:
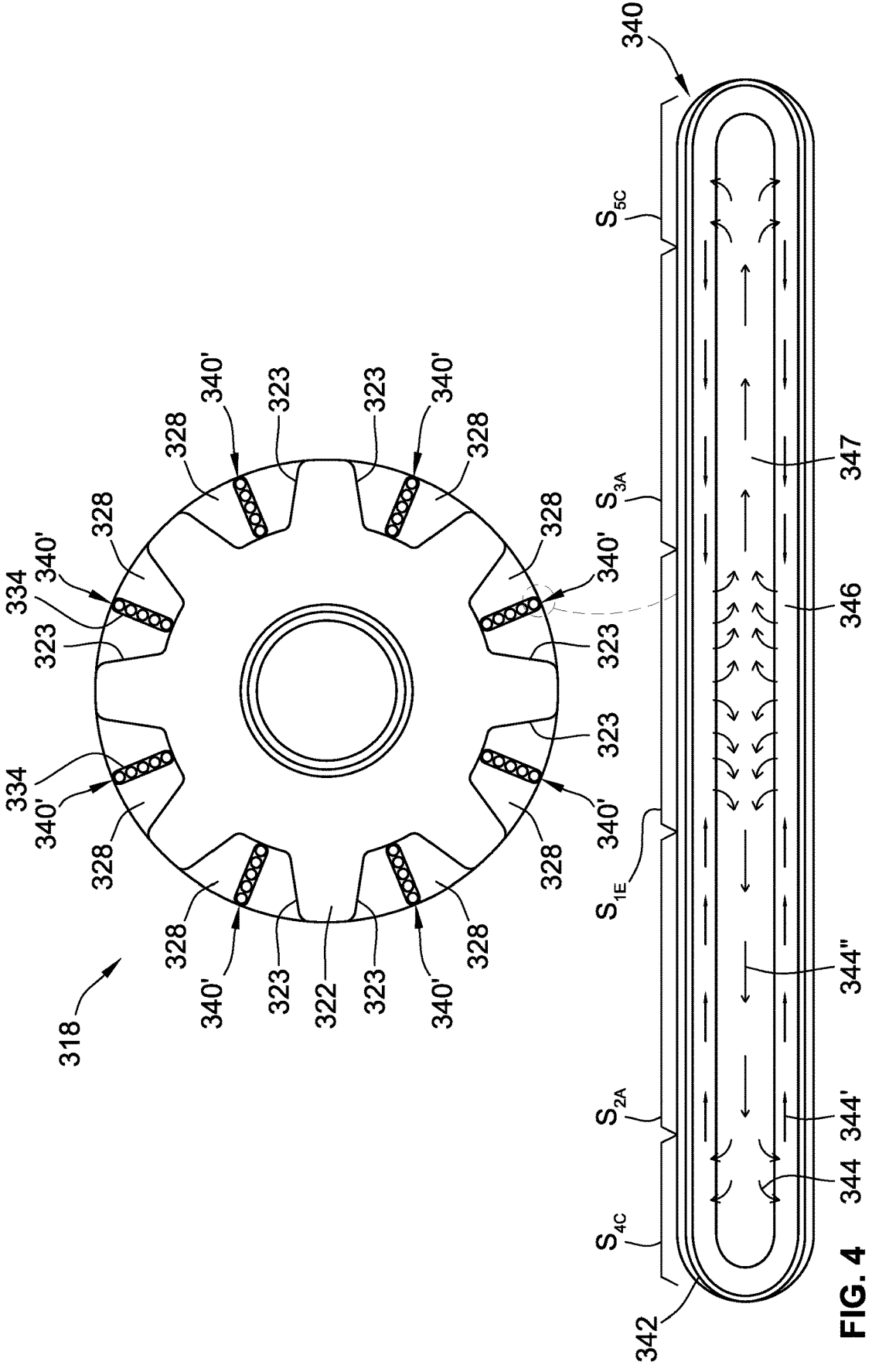
FIG. 4 is an end-view illustration of the rotor assembly of the representative electric machine of FIG. 3 shown with the rotor endcaps removed to better see the winding-slot embedded heat pipes nested within the rotor-borne electromagnetic windings.

To passively cool the rotor assembly 318 during operation of the electric machine 310, at least one heat pipe 340 is mounted in one or more of the rotor slots 323 to extract thermal energy from a rotor-borne winding 328. In accord with the illustrated example, each rotor slot 323 is an open-faced, axially elongated channel that is recessed radially inward into the outer-diameter surface of the rotor core 322 and securely nests therein a respective bundle of rotor windings 328 (e.g., a cluster of winding segments of a single-wire winding or of multiple wire windings). A single heat pipe 340 or a set of heat pipes 340' may be embedded in each rotor slot 323, entrenched within the bundle of rotor windings 328 in that slot 232. For high-speed, high-torque applications, multiple heat pipes 340 (e.g., five in the drawings) may be stacked one on top of the other in a rectilinear line that extends radially with respect to the rotor core 322, as best seen in FIG. 4. A total height of the pipe stack 340' may be substantially equal to a radial depth of the slot 323. When stacked in this manner, the individual heat pipes 340 may be mutually parallel and radially spaced from one another, as best seen in FIG. 3. These rectilinear heat pipe stacks 340' may be circumferentially spaced around the rotor core 322—located equidistant from one another—with each stack 340' oriented at an oblique angle (e.g., about 45 degrees) with respect to its immediately neighboring stacks 340'.

While depicted and described herein as using slot-embedded heat pipes, the electric machine 300 of FIG. 3 may replace any or all of the heat pipes 340 with thermal-energy dissipating vapor chambers. For instance, a single, planar vapor chamber may replace each stack 340' of heat pipes 340 within a given rotor slot 323. As a further option, herein described slot-embedded heat pipes and vapor chambers may be adapted for integration into one or more of the stator slots 321 to passively cool the stator assembly 316. It is also envisioned that the rotor assembly 318 may comprise greater or fewer heat pipes 340, which may take on alternative shapes, sizes, and packaging locations from the illustrated configurations. Disclosed rotor-mounted heat pipes and vapor chambers are enclosed, passive thermal management devices that do not interact or interfere with the stator and, thus, reduce system complexity while ensuring that the rotor operating speeds, inertial mass, and structural integrity are maintained for high-speed operation.

For higher speed operations, the heat pipes 340 may be packaged inside of optional slot wedge jackets 334 that help to hold the rotor windings 328 in place during excitation of the rotor assembly 318. It may be desirable that each slot wedge jacket 334 be fabricated as a single-piece, unitary structure from a thermally conductive polymer (e.g., high-density polyethylene (HDPE) or aromatic polyimide) that is wrapped around or overmolded onto a respective stack 340' of the heat pipes 340. In addition to helping retain winding placement, the slot wedge jacket 334 may also preclude direct physical contact between the electromagnetic windings 328 and the heat pipes 340 (e.g., to prevent damage to the winding insulation).

Each heat pipe 340 projects axially from one or both opposing axial ends of the rotor core 322 to thereby extract thermal energy produced by adjacent rotor windings 328 and transfer the extracted thermal energy out from the rotor core 328. The heat pipes 340, in effect, act as thermodynamic conduits that interface the slot-embedded windings 328 with convective-cooling rotor endcaps 350, 352 and conductive-cooling dielectric fluid 332 circulating through an internal coolant chamber of the housing 302. As best seen in the inset view of FIG. 4, each heat pipe 340 may be constructed with a hermetically sealed and thermally conductive canister 342, which may be fabricated as a rigid, hollow tube that is formed from copper or aluminum. The heat pipe canister 342 contains a working fluid (represented in FIG. 4 by arrows 344), such as water, acetone, methanol, ammonia, or a mixture of water and refrigerant, that converts thermal energy (heat) into mechanical energy (and vice versa) by changing phases between liquid 344' and gas 344".

The working fluid is free to flow through five distinct sections along the length of the canister 342: a central "evaporator" section $S_{1E}$, a pair of (first and second) "adiabatic" sections $S_{2A}$ and $S_{3A}$ flanking left and right terminal ends of the evaporator section $S_{1E}$, and a pair of (first and second) "condensation" sections $S_{4C}$ and $S_{5C}$ outboard from the adiabatic" sections $S_{2A}$ and $S_{3A}$. Packaged inside the canister 342 is a fluid-wicking (wick) structure 346 that carries the liquid-phase working fluid 344', e.g., via capillary action, from the condensation sections $S_{4C}$ and $S_{5C}$ at the axials ends of the canister 342 to the evaporator section $S_{1E}$ at the center of the canister 342. The wick structure 346 may take on innumerable form factors, including a roving of fine fibers, a wrapped textile, intertwined metal wires, a mesh screen, a sintered powder wick, etc. As shown, the wick structure 346 presses against and, if desired, substantially covers an interior surface of the canister 342. Extending through the center of the cannister 342 and wick structure 346 us an elongated vapor channel 347 that passes gas-phase working fluid 344" from the evaporator section $S_{1E}$, through the adiabatic sections $S_{2A}$ and $S_{3A}$, and to the condensation sections $S_{4C}$ and $S_{5C}$. When the working fluid 344 condenses, the vapor channel 347 passes the working fluid 344', when condensed to a liquid, into the wick structure 346. For ease of manufacture and simplicity of design, it may be desirable that all of the slot-embedded heat pipes 340 be substantially structurally identical with one another. Moreover, each heat pipe 340 may be a fluidly sealed, discrete unit that lacks fluid porting, e.g., for exchanging fluid with the internal coolant chamber of the housing 302.

During operation of the electric machine 310, the rotor windings 328 will generate a significant amount of heat, especially during high-speed operations (e.g., 10,000+ RPM). A portion of this winding-generated heat will be transferred through the scaled canisters 342 and into the wick structures 346 of the heat pipes 340. The thermal energy from this heat tends to concentrate at the axial centers of the wire bundles; the thermal energy conducts through the central region of the heat pipe canister 342—central "evaporator" section $S_{1E}$—causing a portion of the working fluid 344 sealed within the canister 342 to evaporate. When the working fluid 344 is vaporized from absorbing device-generated heat, the wick structure 346 functions to pass the gas-phase fluid 344" into the vapor channel 347. The gas-phase working fluid 344" migrates axially outwards, e.g., to the left and right in FIG. 4, through the vapor channel 347 and condenses at the opposing longitudinal ends of the heat pipe 340 in the condensation sections $S_{4C}$ and $S_{5C}$. When condensed, the wick structure 346 functions to draw the fluid 344 out of the vapor channel 347. The liquid-phase fluid 344' is pulled inward, under the force of capillary action, through the wick structure 346 to the evaporator" section $S_{1E}$ to start the cycle anew.

To help dissipate thermal energy expelled from the rotor core 322 via the heat pipes 340, a pair of (first and second) rotor endcaps 350 and 352 are securely mounted onto the opposing (first and second) axial faces, respectively, of the rotor core 322 in abutting relation to opposing (first and second) longitudinal ends, respectively, of the heat pipes 340. It may be desirable that each rotor endcap 350, 352 be fabricated with circumferentially spaced sets of heat pipe cavities 351 and 353 (e.g., one cavity per heat pipe) that interface with the rotor-borne stacks 340' of heat pipes 340. Each cavity 351, 353 may be recessed into an axial-inward facing surface of the rotor endcap 350, 352 and nests therein a longitudinal tip of a respective heat pipe 340. These cavities 351, 353 increase the contact surface area between the endcaps 350, 352 and the heat pipes 340 and thereby increase the rate of conductive heat transfer between the interfacing structures. The endcaps 350, 352 act as thermal-body heat sinks in addition to helping minimize windage losses and ensuring the winding 328 are supported for high-speed machine operation.

Each rotor endcap 350, 352 may be fabricated with a respective set of endcap fins 354 and 356 to help dissipate accumulated heat from the endcaps 350, 352 and, thus, the rotor assembly 318 into the internal coolant chamber of the housing 302. Located on outboard facing surfaces of the rotor endcaps 350, 352, these endcap fins 354, 356 protect axially away from the rotor core 322 and into the housing's internal coolant chamber. The pin fins 354, 356 increase the total surface area of the rotor assembly 318 that is exposed within the housing 302 to increase the dissipation of extracted thermal energy received by the rotor endcaps 350, 352, e.g., via convective and, if desired, conductive heat transfer.

To help evacuate winding-generated thermal energy from the machine housing 302, an active thermal management (ATM) system (represented in FIG. 3 via oil pump 360) circulates dielectric coolant fluid 332 into and out of the housing 302 to splash-cool or spray-cool the rotor endcaps 350, 352 and endcap fins 354, 356. The coolant fluid 332 may be an electrically non-conductive, magnetically null oil that is sprayed, e.g., via spray nozzles in stator endcaps 360 and 362, onto the stator windings 326 and rotor endcaps 350, 352 to accelerate the effects of dissipating rotor-field-winding heat. In addition to the increased convective cooling offered by the rotor endcaps 350, 352 and endcap finds 354, 356, the spray/splash of coolant fluid 332 offers immersion-type conductive heat transfer. The spray/splash cooling for the rotor assembly 318 can also be directed to the stator assembly 316 to further improve the peak performance of the electric machine 310. For splash-cooling implementations, it may be desirable that a set of rotor pin fins be arranged in a helical turbine-like pattern to excite the coolant fluid 332 and thereby generate a desired splash effect during excitation of the rotor assembly 318.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An electric machine, comprising:
   a housing;
   a stator assembly including a stator core attached to the housing and an electromagnetic stator winding mounted in a stator slot of the stator core;
   a rotor assembly including a rotor core rotatably attached to the housing adjacent the stator assembly and an electromagnetic rotor winding mounted in a rotor slot of the rotor core, the rotor winding configured to magnetically mate with the stator winding;
   a heat pipe mounted in the rotor slot adjacent the rotor winding and projecting axially from an axial end of the rotor core, the heat pipe being configured to passively extract thermal energy from the rotor winding and transfer the thermal energy out from the rotor core;
   a rotor endcap attached adjacent the axial end of the rotor core and abutting a longitudinal end of the heat pipe to receive therefrom the extracted thermal energy transferred out from the rotor core, the rotor endcap including a heat pipe cavity recessed into an axial surface of the rotor endcap and nesting therein the longitudinal end of the heat pipe.

2. The electric machine of claim 1, wherein the rotor winding includes a bundle of rotor windings mounted in the rotor slot, and the heat pipe includes a plurality of heat pipes mounted in the rotor slot and embedded in the bundle of rotor windings.

3. The electric machine of claim 2, wherein the heat pipes are stacked in a rectilinear line extending radially with respect to the rotor core.

4. The electric machine of claim 3, wherein the heat pipes are mutually parallel and radially spaced from one another.

5. The electric machine of claim 1, wherein the heat pipe includes a sealed canister containing a working fluid configured to change phases between a liquid phase and a gas phase to thereby extract the thermal energy from the rotor winding and transmit the extracted thermal energy out through the axial end of the rotor core.

6. The electric machine of claim 5, wherein the heat pipe further includes a wick structure located inside the sealed canister and configured to transfer the working fluid, when in the liquid phase, from axial ends of the sealed canister to a central region of the sealed canister.

7. The electric machine of claim 1, wherein the rotor slot includes a plurality of rotor slots extending axially through and spaced circumferentially around the rotor core, the rotor winding includes a plurality of rotor windings wound through the rotor slots, and the heat pipe includes a plurality of heat pipes extending axially through the rotor slots substantially parallel to an axis of rotation of the rotor core.

8. The electric machine of claim 7, wherein the heat pipes are arranged in a plurality of pipe stacks spaced circumferentially around the rotor core, embedded in the rotor windings, and each located in a respective one of the rotor slots.

9. The electric machine of claim 1, wherein the rotor endcap further includes a plurality of endcap fins protecting away from the rotor core and configured to dissipate the extracted thermal energy transferred out from the rotor core and received by the rotor endcap.

10. The electric machine of claim 9, further comprising an active thermal management (ATM) system configured to splash or spray a coolant fluid onto the endcap fins.

11. An electric machine, comprising:
a housing;
a stator assembly including a stator core attached to the housing and an electromagnetic stator winding mounted in a stator slot of the stator core;
a rotor assembly including a rotor core rotatably attached to the housing adjacent the stator assembly and an electromagnetic rotor winding mounted in a rotor slot of the rotor core, the rotor winding configured to magnetically mate with the stator winding;
a heat pipe mounted in the rotor slot adjacent the rotor winding and projecting axially from an axial end of the rotor core, the heat pipe including:
a sealed canister containing a working fluid configured to change phases between
a liquid phase and a gas phase to thereby passively extract thermal energy from the rotor winding and transmit the extracted thermal energy out from the rotor core through the axial end of the rotor core;
a wick structure located inside the sealed canister and configured to transfer the working fluid, when in the liquid phase, from axial ends of the sealed canister to a central region of the sealed canister,
wherein the wick structure abuts an interior surface of the sealed canister and defines an elongated central vapor channel configured to pass the working fluid, when vaporized to the gas phase, to the axial ends of the sealed canister and pass the working fluid, when condensed to the liquid phase, into the wick structure.

12. The electric machine of claim 11, further comprising a rotor endcap attached to the axial end of the rotor core and abutting a longitudinal end of the heat pipe to receive therefrom the extracted thermal energy transferred out from the rotor core.

13. The electric machine of claim 12, wherein the rotor endcap includes a heat pipe cavity recessed into an axial surface of the rotor endcap and nesting therein the longitudinal end of the heat pipe.

14. The electric machine of claim 12, wherein the rotor endcap further includes a plurality of endcap fins protecting away from the rotor core and configured to dissipate the extracted thermal energy transferred out from the rotor core and received by the rotor endcap.

15. The electric machine of claim 14, further comprising an active thermal management (ATM) system configured to splash or spray a coolant fluid onto the endcap fins.

16. A method of assembling an electric machine, the method comprising:
receiving a housing of the electric machine;
attaching a stator assembly to the housing, the stator assembly including a stator core and an electromagnetic stator winding mounted in a stator slot of the stator core;
attaching a rotor assembly to the housing such that the rotor assembly is adjacent and rotatable with respect to the stator assembly, the rotor assembly including a rotor core and an electromagnetic rotor winding mounted in a rotor slot of the rotor core;
mounting a heat pipe in the rotor slot such that the heat pipe is adjacent the rotor winding and projects axially from an axial end of the rotor core, wherein the heat pipe is configured to passively extract thermal energy from the rotor winding and transfer the thermal energy out from the rotor core;
attaching a rotor endcap adjacent the axial end of the rotor core such that the rotor endcap abuts a longitudinal end of the heat pipe to receive therefrom the extracted thermal energy transferred out from the rotor core, the rotor endcap including a heat pipe cavity recessed into an axial surface of the rotor endcap and nesting therein the longitudinal end of the heat pipe.

17. The method of claim 16, wherein the rotor winding includes a bundle of rotor windings mounted in the rotor slot, and the heat pipe includes a plurality of heat pipes mounted in the rotor slot and embedded in the bundle of rotor windings.

18. The method of claim 17, wherein the heat pipes are stacked in a rectilinear line extending radially with respect to the rotor core, the heat pipes being mutually parallel and radially spaced from one another.

19. The method of claim 16, wherein the heat pipe includes a sealed canister containing a working fluid configured to change phases between a liquid phase and a gas phase to thereby extract the thermal energy from the rotor winding and transmit the extracted thermal energy out through the axial end of the rotor core.

20. The method of claim 19, wherein the heat pipe further includes a wick structure located inside the sealed canister and configured to transfer the working fluid, when in the liquid phase, from axial ends of the sealed canister to a central region of the sealed canister.

\* \* \* \* \*